(12) United States Patent
Moore et al.

(10) Patent No.: US 6,618,752 B1
(45) Date of Patent: Sep. 9, 2003

(54) SOFTWARE AND METHOD FOR MULTICASTING ON A NETWORK

(75) Inventors: Victor S. Moore, Boynton Beach, FL (US); Glen R. Walters, Hollywood, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/551,413

(22) Filed: Apr. 18, 2000

(51) Int. Cl.[7] .............................................. G06F 15/16
(52) U.S. Cl. ....................... 709/217; 709/203; 709/219; 709/236; 370/429; 370/252
(58) Field of Search ................................ 709/203–205, 709/217, 219, 233, 236; 370/429

(56) References Cited

U.S. PATENT DOCUMENTS

| | | | |
|---|---|---|---|
| 5,805,823 A | * | 9/1998 | Seitz ........................ 709/236 |
| 6,006,254 A | * | 12/1999 | Waters et al. ................ 709/205 |
| 6,078,948 A | * | 6/2000 | Podgorny et al. ............ 709/204 |
| 6,195,680 B1 | * | 2/2001 | Goldszmidt et al. ......... 709/203 |
| 6,253,241 B1 | * | 6/2001 | Chaddha ..................... 709/223 |
| 6,272,536 B1 | * | 8/2001 | van Hoff et al. ............. 709/217 |
| 6,275,496 B1 | * | 8/2001 | Burns et al. ................. 370/429 |
| 6,345,293 B1 | * | 2/2002 | Chaddha ..................... 709/219 |

* cited by examiner

Primary Examiner—David Wiley
Assistant Examiner—Phuoc Nguyen
(74) Attorney, Agent, or Firm—Richard A. Tomlin; Jon A. Gibbons; Fleit, Kain, Gibbons, Gutman & Bongini P.L.

(57) ABSTRACT

A system for multicasting a data stream transmits portable child hosts to client computers requesting to receive the multicast. The child hosts are capable of receiving the multicast data stream and also transmitting the data stream to other clients which subsequently request reception of the multicast data stream. Methods for managing the network to minimize the bandwidth load on participating computers, and to reconfigure the network when clients join or leave the network are also disclosed. According to another aspect of the invention a system and computer readable medium is disclosed for carrying out the above method.

28 Claims, 18 Drawing Sheets

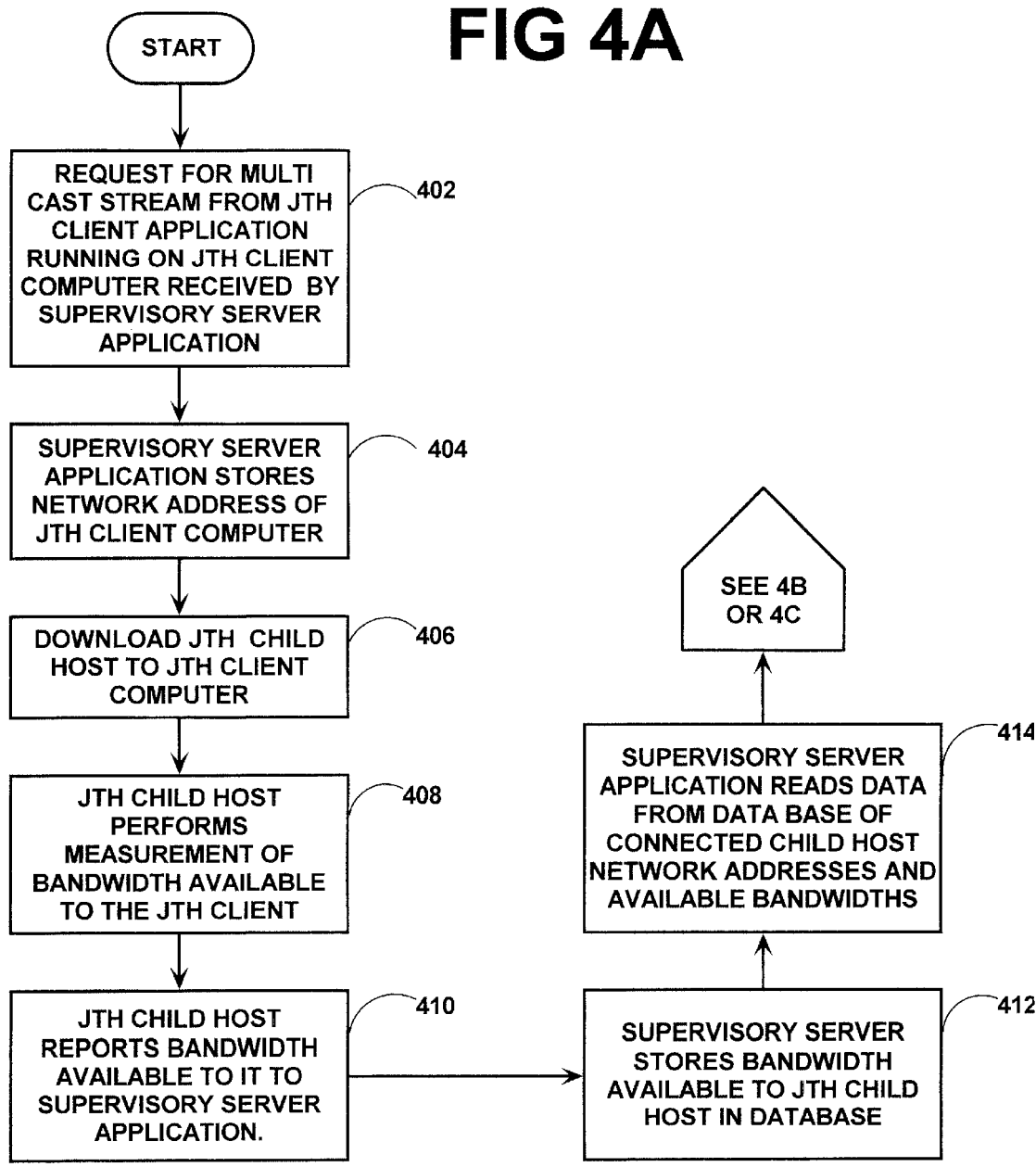

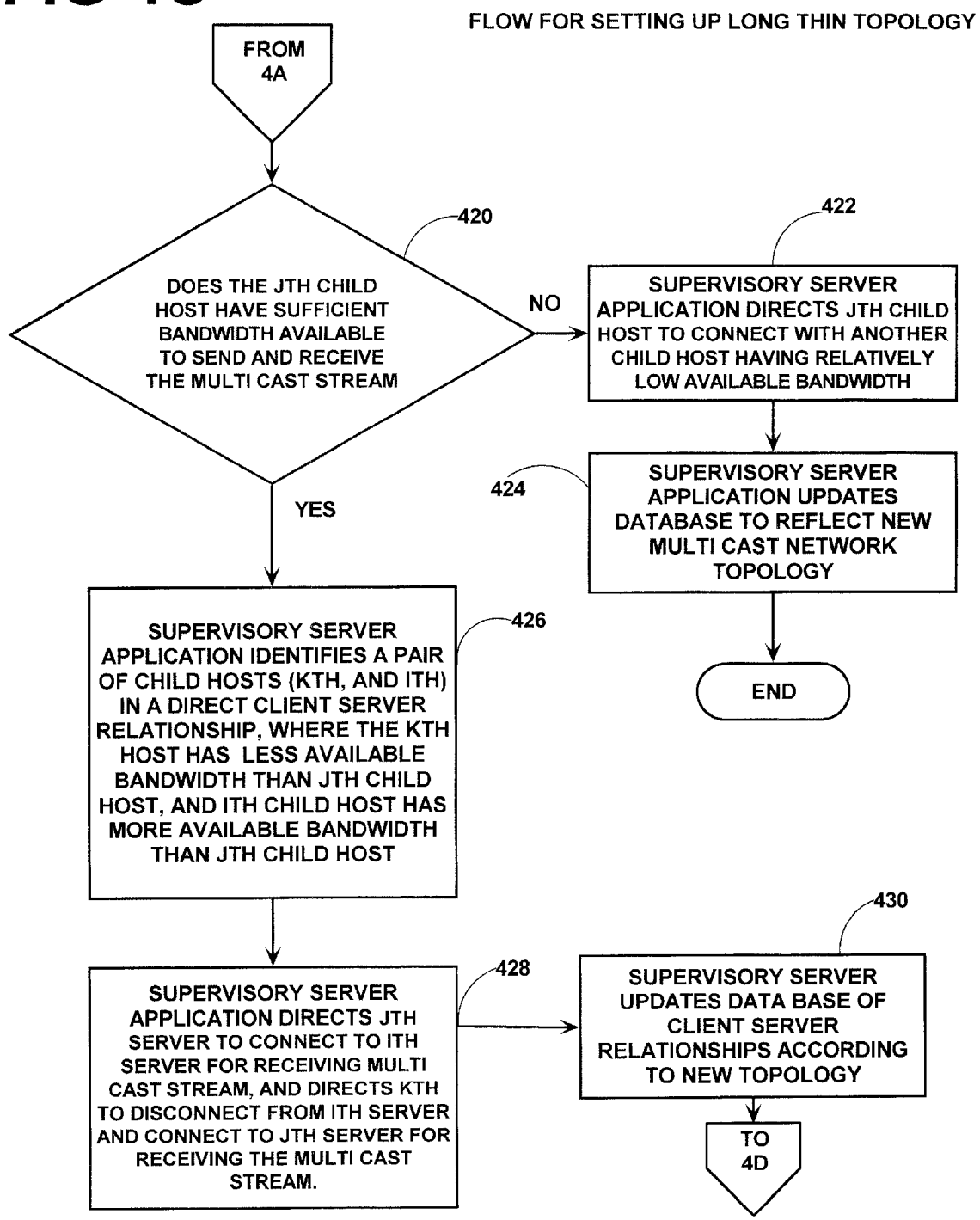

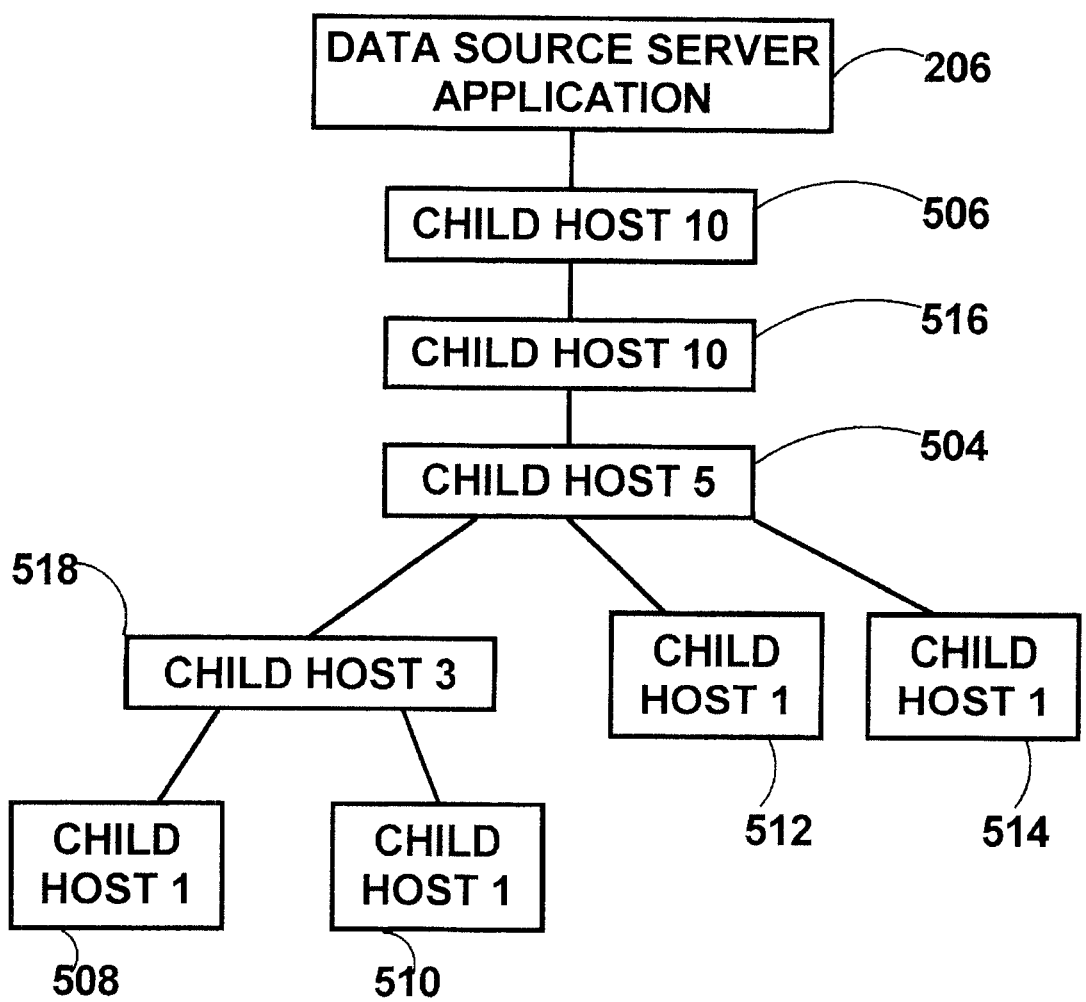

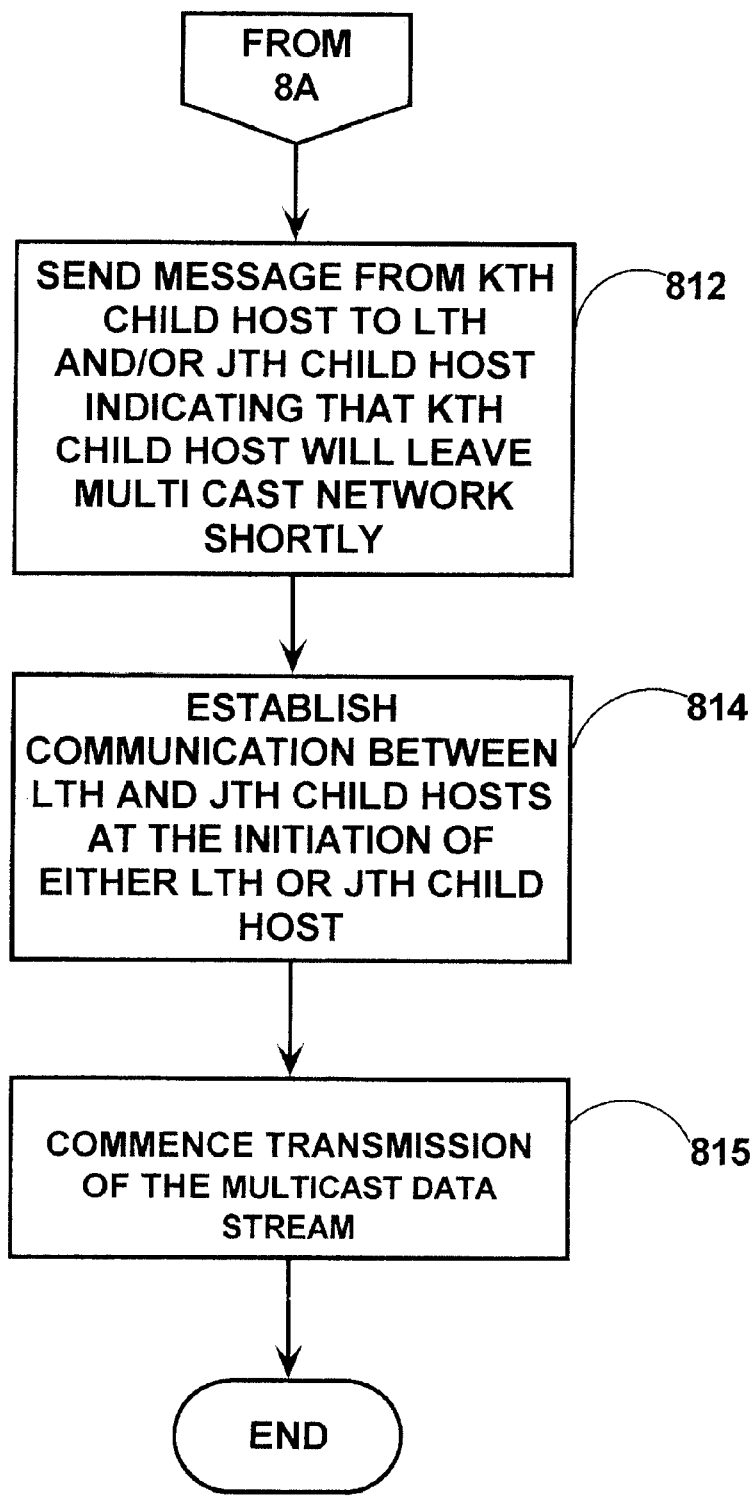

SOFTWARE AND METHOD FOR MULTICASTING ON A NETWORK

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention pertains to concurrent distribution of data to a variable set of users on a network. More particularly the invention is a method and software for setting up a virtual network within a network for concurrent distribution of one or more data items that avoids overloading any specific data link in the network, e.g., the data link directly connected to the data source. The invention may be used to broadcast an audio stream, e.g., a radio broadcast over the Internet.

BACKGROUND OF THE INVENTION

In recent years the Internet has had the effect of greatly facilitating communication through a wide variety of media, e.g., text, images, sound, video, data, design documents. Non real time communication over the Internet includes, news groups, static web pages, list servers, and E-mail (variable latency).

Near real time communication includes Internet Relay Chat (IRC), and multicasting. Multicasting, which is increasing in popularity, is generally speaking, the distribution of a data file or continuous (indeterminate length) data feed in near real time, nearly concurrently, (with variable lags depending on the data transit time in the network), to a group of client devices (e.g., computers operated by users).

The data may take the form of digitally encoded audio. The Moving Pictures Expert Group (MPEG) Layer III standard (MP3), defines an encoding scheme that provides a good quality and compression audio encoding standard.

The capability to transmit high quality audio over the Internet, has led to the development of Internet radio. Internet radio makes technically and economically feasible to operate radio stations with a narrow topical focus, and an audience sparsely distributed over a large geographic area to be operated. Cost, and government regulations would make it difficult to operate such stations using conventional analog wireless radio technology.

Another type of data discussed in connection with multicasting are slide presentations, i.e., a sequence of images, which may also be accompanied by a digital audio oration.

As the data carrying capacity (bandwidth) of the Internet increases, for example by proliferation of fiber optic, and digital subscriber line (DSL) data links to remote users, multi-casting of video can be expected to come into use.

One type of currently available form of multicasting systems is exemplified by the Real Audio system including Sold by Real Networks, of Seattle, Wash. This system includes servers and clients. A broadcaster such as an Internet based radio station, operates a Real Audio server application on its server computer. Users wishing to listen to the radio station would run a Real Audio client which would connect through the Internet to the Real Audio server, receive a stream of compressed digitally encoded audio therefrom which it would decompress, decode and play through the client computers sound system (i.e., sound card and speakers). The encoding system used in the Real Audio system is proprietary. Another similar system which is based on the MP3, standard for encoding audio is provided by the Shoutcast system by America Online of Dulles, Va. A limitation of both of, the above mentioned systems is that the number of clients that can access the audio stream is limited by the data carrying capacity of the connection between the audio server and the network (e.g., Internet) through which the audio stream is distributed.

Mbone is a protocol for establishing a bandwidth efficient multicasting network on the Internet. The system makes use of a range of IP addresses reserved for multicasting, and provides a system for efficiently distributing a multicast data to a plurality of users. In conformance with the protocol an efficient network (e.g., a spanning tree) which avoids duplicative transmissions is set up for transmitting the multicast data from its source, to a set of recipients. In order to participate in the Mbone network, network routers, and hosts must run Mbone specific software. Additionally clients computers must run Mbone compliant applications, and Mbone compliant communication protocol stack software. At this time support of Mbone, e.g., among Internet Service Providers, is not wide spread, so its use by end users is limited.

What is needed is a system and software, that makes it possible for multicasts to be made to a community of recipients, the size of which is not limited by the bandwidth of the connection between the data source and the distribution network (e.g., Internet).

What is further needed is a system for bandwidth efficient multicasting that does not depend on users having access to servers running special multicasting software (e.g., Mbone software).

SUMMARY OF THE INVENTION

Briefly, the invention is a system and method for multicasting which includes the steps of receiving a Jth request for receiving a multicast stream by supervisory server application running on a supervisory server from a Jth client running on a Jth computer, transmitting a Jth instance of a portable deployable child host to the Jth computer, establishing a Jth connection between the Jth instance portable deployable child host and an Ith portable deployable host, transmitting a multicast data stream though the Jth connection from the Ith instance of the child host to the Jth instance of the child host, receiving a Kth request for receiving a multicast stream by the supervisory server application from a Kth client running on a Kth computer, transmitting a Kth instance of the portable deployable child host to the Kth computer, establishing a Kth connection between the Kth instance of the portable deployable child host and the Jth instance of the portable deployable child host, transmitting the multicast data stream through the Kth connection from the Jth instance of the child host to the Kth instance of the child host.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 4A–D depict portions of flow diagrams for managing the adding of new clients to a deployable multicasting distribution network.

FIGS. 5A–D show a sequence of snapshots of a distributed multicasting network as new clients are added.

FIGS. 8A–C depict flow diagrams for methods for distributed management of network reconfiguration in the event that a client leaves a multicasting network.

DETAILED DESCRIPTION OF THE PREFERRED EMBODIMENTS

It is important to note that these embodiments are only examples of the many advantageous uses of the innovative teachings herein- In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Network

Figure 1:
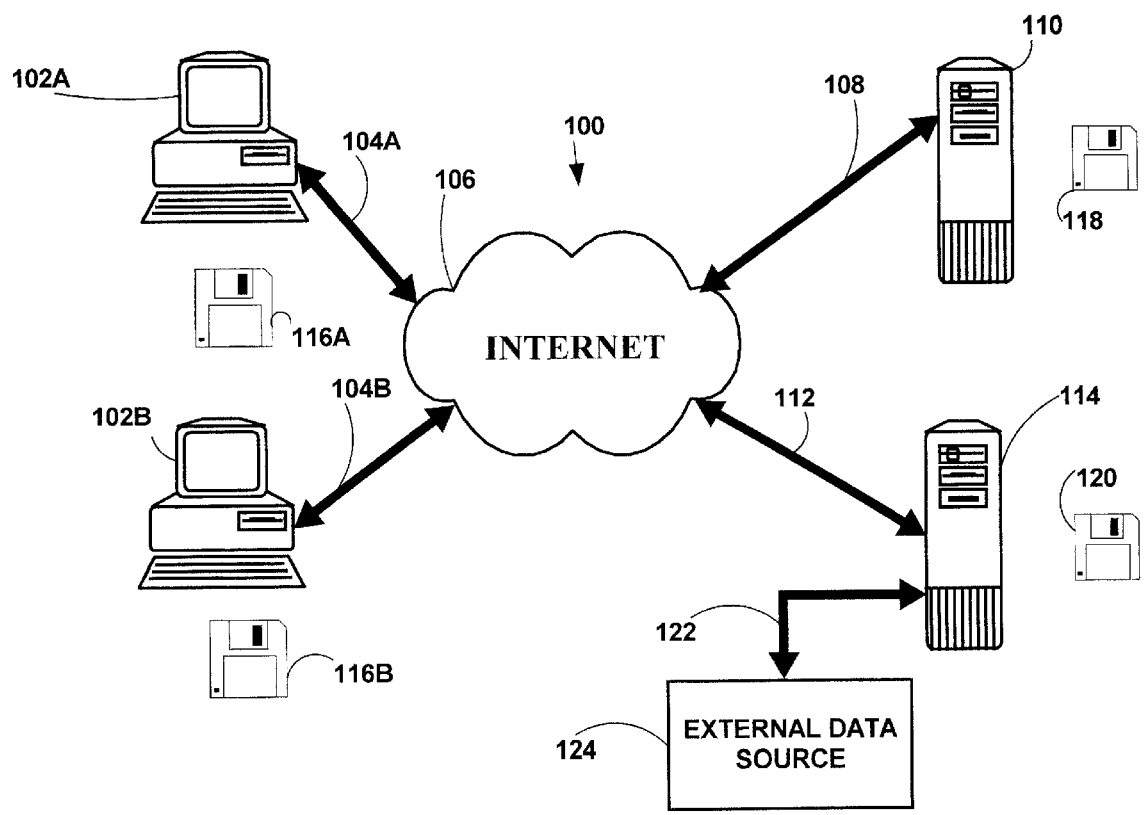
FIG. 1 is a schematic of a computer system used in practicing an embodiment of the invention.

Referring to FIG. 1 a schematic of a computer system 100 used in connection with an embodiment of the present invention is depicted. The computer system comprises a first client computer 102A, and a second client computer 102B, connected to a computer network, in this embodiment, the Internet 106, through bidirectional data links 104A, and 104B respectively. Computer readable media 116A, 116B are provided for loading client software onto the two client computers 102A, and 102B. The software loaded onto the client includes but is not limited to, communication software, and multicast data processing software, e.g., a digital audio decoder program. The software taught by the invention will be described below in more detail with reference to the flow diagrams.

It is to be understood, that the two client computers are merely a representative depiction, and in fact the method and software of the invention as will be described below, is meant to provide multicasting to a large number of client computers.

A supervisory server 110 is connected to the Internet through a bidirectional data link 108. A computer readable medium 118 is provided for loading software onto the supervisory server. Software used in the practice of this invention will be described below with reference to the flow diagrams. Additionally the supervisory server may be provided with communication software, and other general purpose server software.

A multicast data source server 114 is connected to the Internet through a bidirectional data link 112. The data source server may be provided with communication software that establish connections with client computers for transmitting a multicast data stream. The data source server 114 is optionally connected to an external data source 124, through a bidirectional data link 122, e.g., a parallel port connection. The external data source could for example take the form of a mass storage device, e.g., CD-ROM jukebox, or a broadcast feed system. The latter may comprise for example, an arrangement of one or more microphones, recorded audio playback devices, a mixer, and amplifier. For processing an analog audio signal, e.g., a signal from a microphone, the data source server would be equipped with a sound card (not shown), e.g., a Soundblaster card manufactured, by Creative Labs of Stillwater, Okla. Sound cards comprise analog to.digital converters used to digitize the audio signal. A driver for the card for encoding the audio into the desired format, e.g., MP3, would be loaded onto the data source server from machine readable media 120.

The functions of the supervisory server 110, and the multicast data source server 114 could be performed by one server computer. Separating the functions to two or more computers allows the work load to be spit and makes for increased system capacity.

The bidirectional data links between the computers, 104A, 104B, 108, and 112 may for example comprise modem connections over analog data lines, or Digital Subscriber Lines. It should be understood, that the bidirectional data link 112 between the multicast data source server and the Internet 106, in the present invention need not be a very high capacity data link, and furthermore, the number of clients receiving the multicast data is not limited by the bandwidth of bidirectional data link 112. Moreover this is accomplished without the use Mbone infrastructure.

Exemplary Functional Block Diagram of Various Software Components

Figure 2:
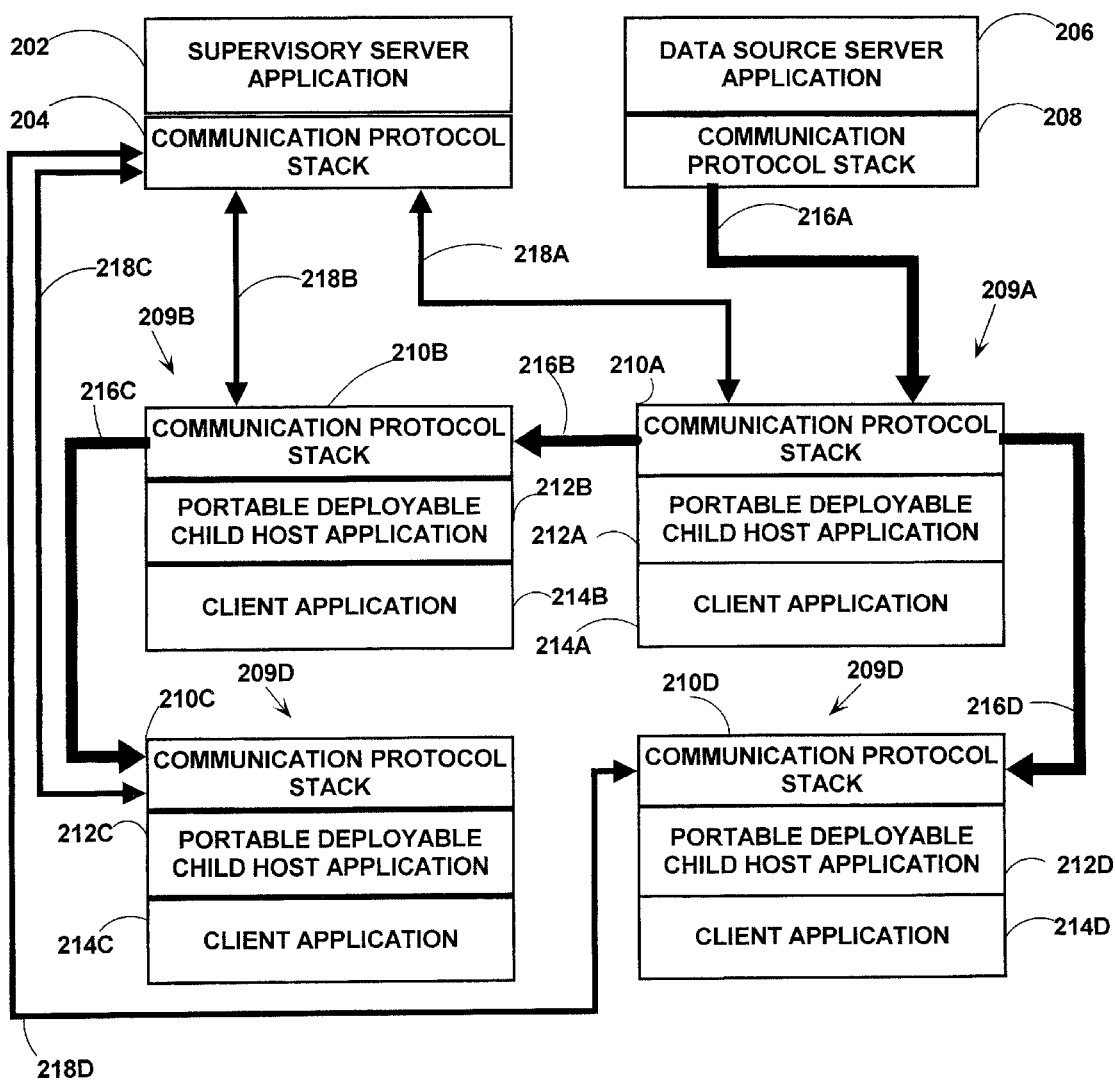
FIG. 2 is a representation of software interrelationship according to an embodiment of the present invention.

Referring to FIG. 2 a schematic 200 representing the interconnection of software components according to a preferred embodiment of the invention is shown. Generally, FIG. 2 depicts, a supervisory server application 202, and a data source application 206, connected in a network, to four client applications 214A–D. The data source application 202, and the supervisory server 204, communicate through communication protocol stacks 208, 204, and 210A–D with the clients. Direct communications connections 218A–D are established by the communication protocol stack 204 associated with the supervisory server application, and the communication protocol stacks 210A–D associated with each of the client applications 214A–D. A hierarchical network of connections 216A–D establishes communication between the data source server 206, and the communication protocol stacks 210A–D associated with the four client applications 214A–D. The communication protocol stacks may for example comprise Internet Protocol over Transfer Control Protocol (TCP/IP). In the context of the Internet each of the connections 216A–D, and 218A–D, may be characterized by a unique set of IP addresses and port numbers. The client applications may for example comprise a digital audio decoder and player, e.g., a Shoutcast client. The data source server application performs the function of sending the multicast data. The supervisory server application plays a role in managing a network for distributing the multicast data as will be discussed in more detail below.

Interceding between the four client applications 214A–D, and the four associated communication protocol stacks 210A–D are four portable deployable child hosts 212A–D. The child host applications are capable of receiving and sending a multicast data stream.

The supervisory server application could be run on supervisory server 110, shown in FIG. 1; the data source server application 206 could be run on data source server 114 shown in FIG. 1, two of the client applications 214A–D, and respective child hosts 212A–D could run on clients 102A, and 102B shown in FIG. 1. The remaining and additional child hosts could run on additional client computers not shown in FIG. 1.

Exemplary Method for Accepting client into Multicast Network

Figure 3A:
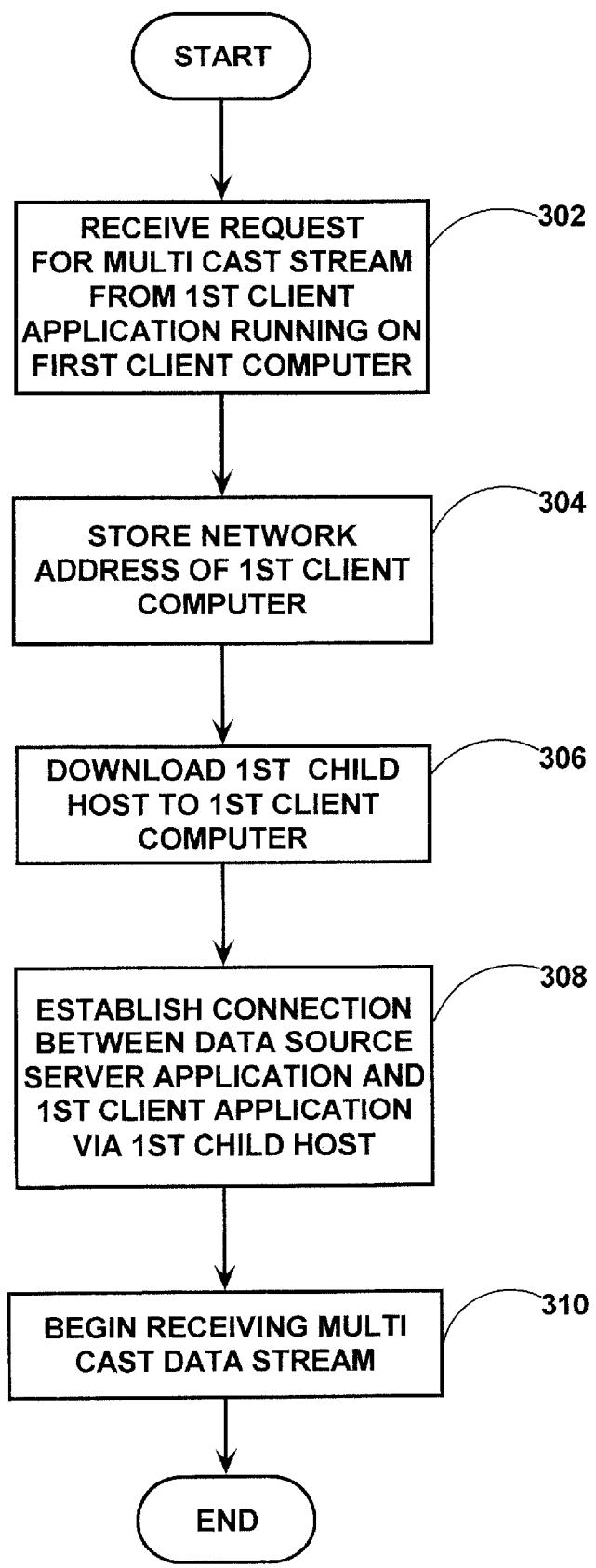
FIG. 3A depicts a flow diagram of a process of accepting a first client into a multicasting distribution network.
Figure 3B:
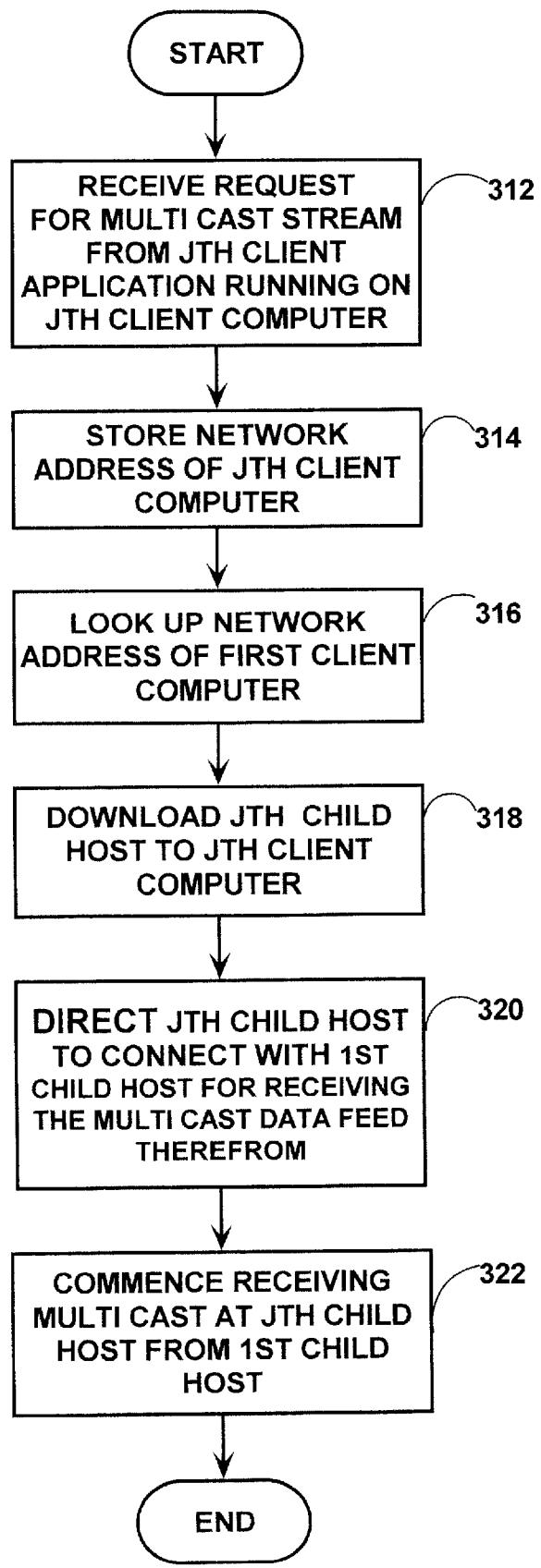
FIG. 3B depicts a flow diagram of a process of accepting a client other than the first into a multicasting distribution network.
Figure 3C:
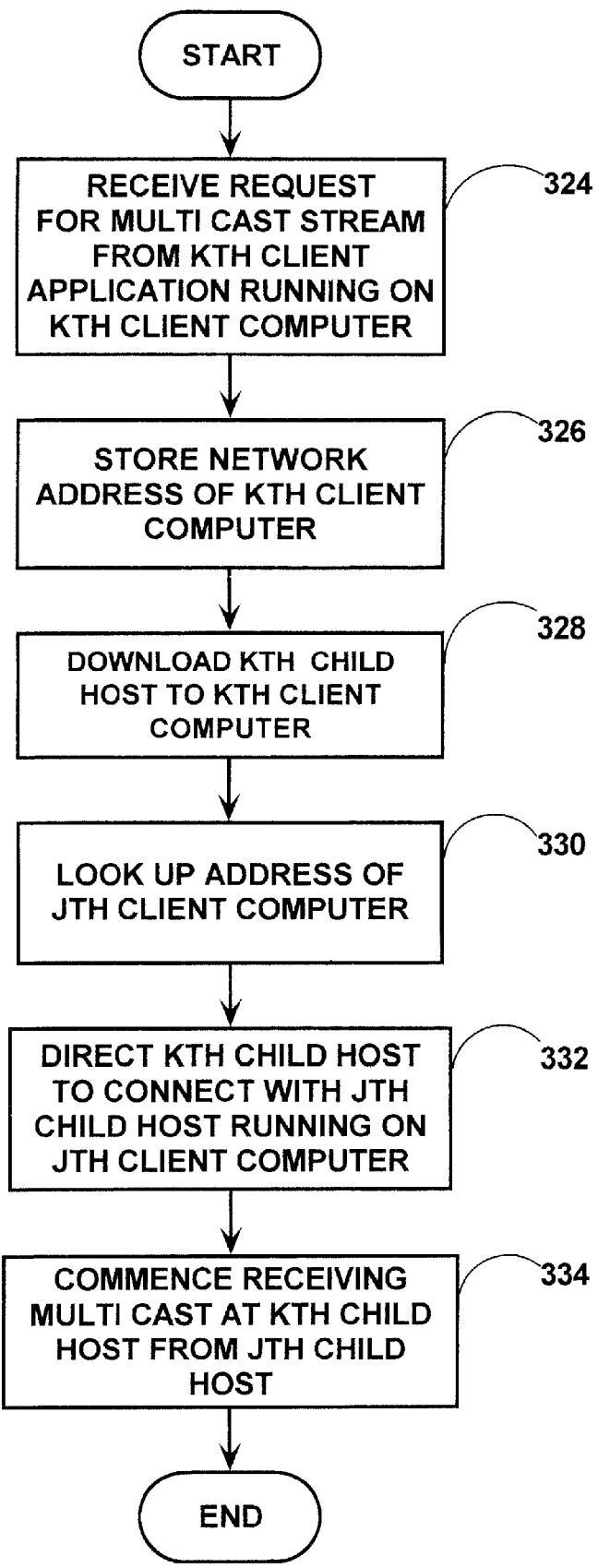
FIG. 3C depicts a flow diagram of a process of accepting a Kth client into a multicasting distribution network.

Referring to FIGS. 3A–C a method for accepting the first and two other clients into a multicasting network is shown.

Referring to FIG. 3A in particular, the process of accepting the first client into the multicasting network is shown. In process block 302, a request to receive the multicast data stream is received by the supervisory server application 202 from a first client application, e.g., 212A, running on a first client computer, e.g., 102A. The client applications may for example take the form a web browsers, e.g., Netscape Communicator, produced by America Online of Dulles Va., which communicate request to the supervisory server application via Hypertext Transfer Protocol HTTP. The supervisory server application may take the form of a Common Gateway Interface (CGI) program. The request may be initiated by activating a hyperlink which refers to the multicast, and points to the aforementioned CGI program. In the next process block 304, the network address of the first client computer is recorded in a memory accessible to the supervisory server application, e.g., a memory of supervisory server 110. In the next process block 306, a first child host, e.g., 212A is downloaded to the client. The child host may take the form of an applet written in the Java programming language which runs within the web browser. In the next process block, a connection, e.g., 216A is established between the data server application 206, and the client application via their associated communication protocol stacks, with the portable deployable intermediate the client application 214A, and the associated communication protocol stack 210. The first child host may be furnished with the IP address of the data source server, and initiate the connection after it is downloaded and begins execution. In process block 310 reception of the multicast stream is commenced. The multicast stream is transmitted from the data source application, 206 by the associated communication protocol stack 208, and received by the communication protocol stack 210A associated with the first client application 214A through the connection 216A, received by the portable deployable child host 212A, and finally relayed to the client application 214A.

Referring to FIG. 3B, a process for accepting another client after the first client into the multicasting network is shown. In process block 312, a request to receive the multicast data stream is received from another client (the "Jth" client) running on the Jth computer, by the supervisory server application 202. In process block 314, the network address of the Jth computer is stored by the supervisory server application 202. In process block 316 a Jth child host is downloaded to the Jth computer. In process block 318, the supervisory server application looks up the network address of the first client computer which was stored in process block 304. In the next process block a Jth instance of the child host is downloaded to the Jth computer. In process block 320 the supervisory server application directs the Jth child host to connect with the first child host for receiving the multicast data feed therefrom. In process block 322, reception of the multicast data stream by the Jth client through the Jth child host from the first child host commences. In other words the Jth client receives the multicast data feed indirectly, from the data source server application 206, through the 1st portable deployable child host 212A.

Referring to FIG. 3C a process for accepting another client into the multicast a distribution network. As will be described in this case the new client connects to another child host further downstream in a hierarchal distribution network.

In process block 324 a request to receive the multicast data stream is received by the supervisory server application from a Kth client application running on a Kth client computer. In process block 324, the network address of the Kth client computer is stored for future reference. (In the event that other clients wish to join the multicast distribution network they may be assigned to receive the multicast data stream from the Kth server application.) In process block 328 a Kth child host is downloaded to the Kth client computer. In process block 330 the address of the Jth child is retrieved, having been stored in process block 314. In process block 332, the Kth child host is directed to connect with the Jth child host running on the Jth computer. In process block 334 the Kth client application begins receiving the multicast data stream through the Kth child host from the Jth child host, which as stated above receives the multicast stream from the first child host which itself receives the multicast data stream from the data source server.

The multicast distribution network can continue to be built up along the lines illustrated with reference to FIG. 3 above, as new clients request reception of the multicast. There may also be forks in the distribution network, i.e., two child hosts receiving the multicast data stream,from a single child host. The latter is shown in FIG. 2, where both child host 212B and child host 212D receive the multicast data feed from child host 212A through the associated communication protocol stacks 210A, 210B, and 210D, which are connected via connections 216B and 216D.

Exemplary Methods for Managing a Multicast Network Topology Which Takes into Account the Bandwidth Available to the Clients in the Network FIGS. 4A–D depict, flow diagrams of processes for managing multi-tiered hierarchal multicasting network made up of deployable child hosts, which takes into account the bandwidth available to the client computers participating in the network is shown. Two alternative processes are depicted. A first alternative shown in FIGS. 4A, and 4B merely ensures that child hosts to which other child hosts are directed for receiving the multicast stream have sufficient bandwidth to handle dependant child hosts. A second alternative shown in FIGS. 4A, 4C, and 4D seeks to establish a long thin multicast distribution network. A long thin network has the advantage that on average, clients in the network use a relatively low amount of their available bandwidth. On the other hand, in a long thin network as opposed to a network with more branching closer to the root (data source) a failure of one child client can will typically affect more dependant clients.

Exemplary Method for Ensuring that Child Hosts Have Sufficient Bandwidth to Support Dependant Child Hosts In process block 402, a request to receive the multicast stream is received from a Jth client application running on a Jth computer, by the supervisory server application. In process block 404, the supervisory server application stores the network address of the requesting Jth client computer. In process block 406, a Jth instance of a child host is downloaded to the Jth client computer.

In process block 408, the Jth child host performs a check of the bandwidth available to the Jth client. One known way to do this is to time a download of a small test file from a server which has a high speed connection to the network, and low utilization, so that it itself does not limit the speed of the download. It is possible to maintain such a server exclusively for the purpose of checking bandwidth. Other ways of checking the bandwidth available to client computer are known in the art.

Figure 4B:
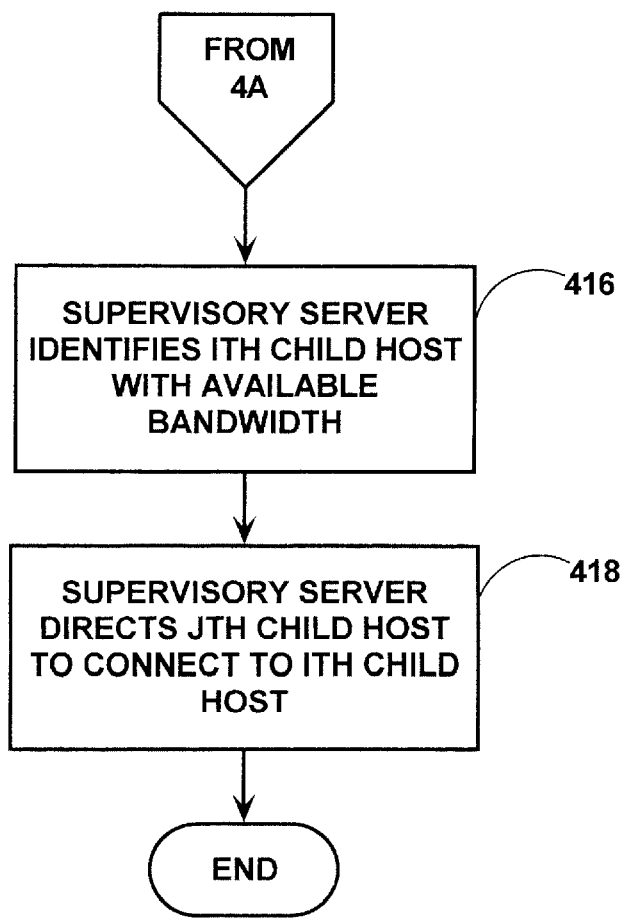

In process block 410, the Jth child host reports the bandwidth available to it to the supervisory server application 202. In process block 412 the supervisory server application 202 stores an indication of the bandwidth available to the Jth child host in a database. In process block 414 the supervisory server application 202, reads data from a database of connected child host network addresses and their respective available bandwidths. Referring to FIG. 4B, in process block 416, the supervisory server identifies an Ith child host listed in the database which has sufficient bandwidth available to feed the multicast data to the Jth child host. In process block 418 the supervisory server directs the Jth child host to connect to the Ith child host for receiving the multicast data stream therefrom.

Exemplary Method for Managing the Topology of a Long Thin Multicast Distribution Network Referring to FIG. 4C an alternative continuation of the process begun in FIG. 4A, which is suited for managing the topology of a long thin multicast distribution network is shown. In process block 420, a determination is made by the supervisory server application based on at least one or more of the indication of the bandwidth available to the Jth client which was stored in process block 412 and the bandwidth required for carrying the multicast stream, which is known to the supervisory server application, as to. whether the Jth client has sufficient bandwidth to both receive and send the multicast data stream. If it does not, then in process block 422, the supervisory server application directs the Jth child host to connect with another child host, a record of which was read in process block 414, which has a relatively low bandwidth but sufficient bandwidth to both send and receive the multicast data stream. In process block 424, the supervisory server application updates a database of to reflect the new network topology based on the assignment of the Jth child host. The supervisory server application may would then update the record of the bandwidth available to the child host to which the Jth child host connected based on it's increased burden of sending the multicast data to the Jth child host.

If the Jth client does have enough bandwidth to both send and receive data, then in process block 426 the supervisory server application would scan the database to find a pair of child host (call them Kth and Ith) connected in a client server relationship where the upstream child host (Kth) has available more bandwidth than the Jth child host, and the downstream child host (Ith) has less bandwidth available. Alternatively, though not preferably, the selection may be less strict so that the bandwidth available to the Jth child host may be equal merely comparable to the bandwidth to the Ith and/or Kth child hosts. For the purpose carrying out process block 426, the data source server is considered to have an available bandwidth higher than the highest bandwidth available to any child host, regardless of its actual available bandwidth. In process block 428, the supervisory server application directs the Jth child host to connect to the Kth child host and directs the Ith child host to connect to the Jth child host and to disconnect from the Kth child host. In process block 430 the database maintained by the supervisory server application is updated to reflected the change in the multicast network topology.

Figure 4D:
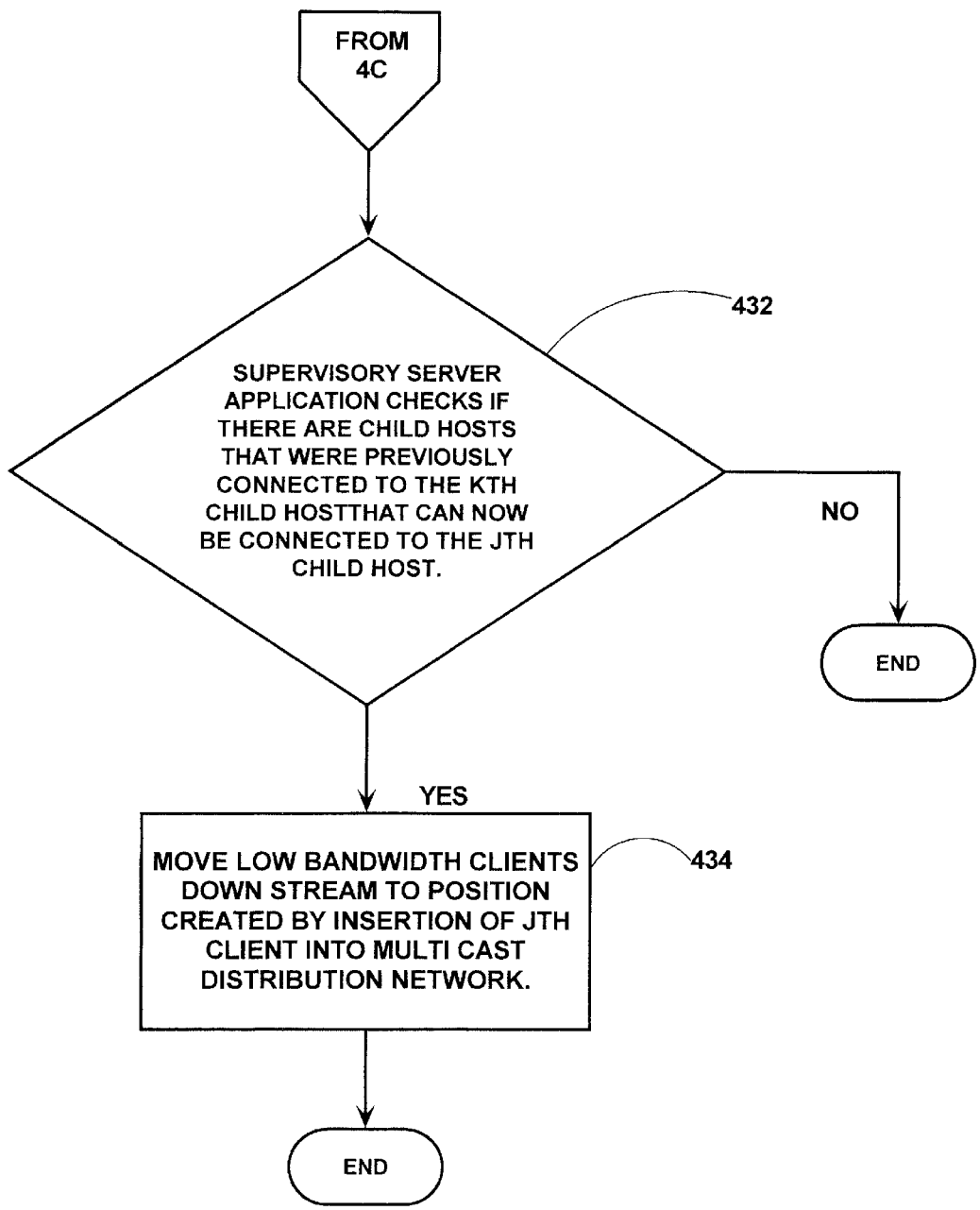

Referring to FIG. 4D, in process block 432 the supervisory server application checks if there are other child hosts that are connected to the Kth child host that can now be moved downward in the multicast distribution network by connecting them to receive from the Jth child host. The Jth child host has less available bandwidth than the Kth, so situations may arise where if there are child hosts receiving the multicast from the Kth child host, they can not all be moved down to connect to the Jth child host. In process block 434 child hosts previously receiving the multicast feed from the Kth child host are directed to connect to the Jth child host.

Illustration of Evolving Network Topology as Clients are added to a Multicast Network According to the Teachings of the Invention.

FIGS. 5A–5D show a sequence of "snapshots" of the multicast network topology, as new clients join the network. In FIGS. 5A–5D, the number inside the boxes representing the child hosts, indicates the approximate bandwidth available to the child hosts in multiples of the bandwidth required to send or receive the multicast data stream.

Figure 5A:
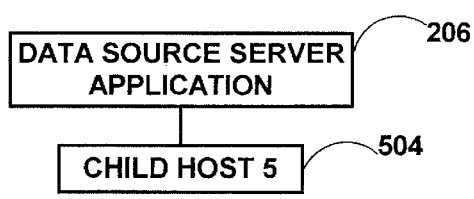
Figure 5B:
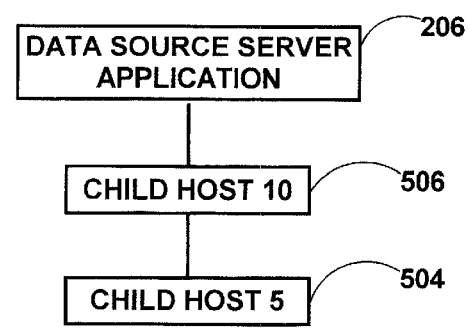
Figure 5C:
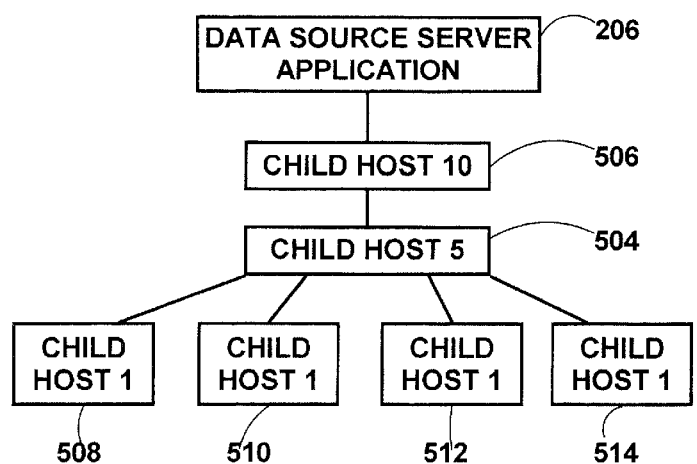

In FIG. 5A a single child host 504 is shown connected to the data source server application 206. In FIG. 5B a second child host 506, has joined the multicast network and has been inserted between the child host 504, and the data source server application. In FIG. 5C four child hosts 508, 510, 512, and 514 which have only sufficient bandwidth available to them to receive the multicast but insufficient to transmit the multicast have joined the network and have been assigned to child host 504.

Referring to FIG. 5D, a new child host 516 having available bandwidth approximately equal to child host 506 has been inserted between child host 506 and 504. A new child host 518 having bandwidth sufficient for three connections has been connected to child host 504, and child hosts 508 and 510 have been connected to child host 518 for receiving the feed therefrom.

Exemplary Method for Handling a Child Host Leaving the Multicasting Network

Figure 6A:
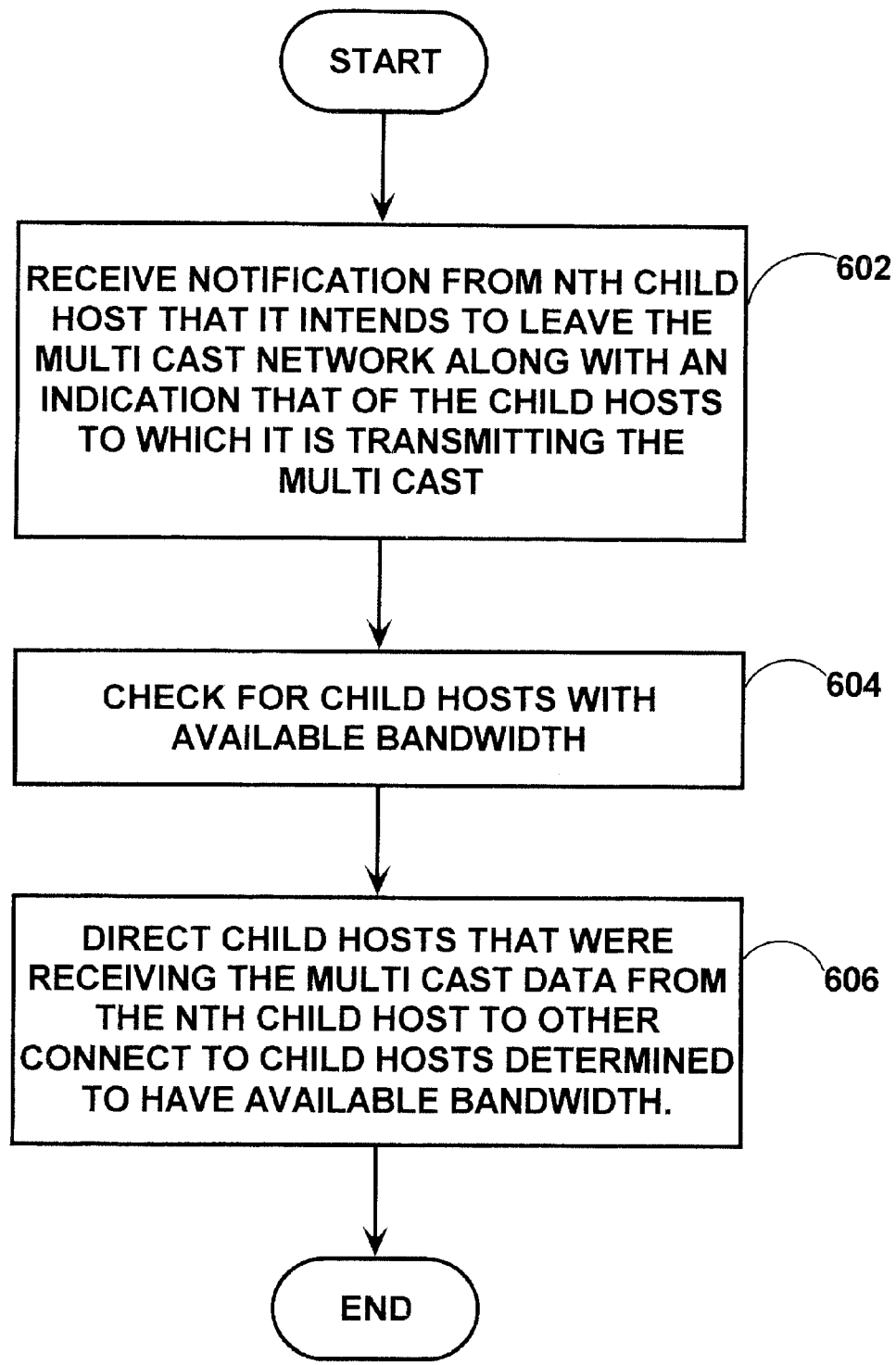
FIGS. 6A–B depict flow diagrams of methods for reconfiguring a distributed multicasting network when a client participant in the network signals its intention to leave the network.

Referring to FIG. 6A, a method for handling a child host leaving the distribution is show in flow diagram form. In process block 602 notification is received by the supervisory server application from the Nth client through the Nth child host that it intends to leave the multicasting network along with an indication of the child hosts to which it is transmitting the data stream. In process block 604, a check is made by the supervisory server application for child hosts with sufficient bandwidth to transmit the multicast stream to the child hosts dependant on the Nth child host. This check may for example be carried out by checking a database maintained by the supervisory server application or by polling child hosts in the multicast network. In process block 606 child hosts that were receiving the multicast data stream from the Nth client are directed to connect to other child hosts determined to have available bandwidth.

Exemplary Method for Handling a Child Host Leaving the Multicasting Network Using Database Record of Topology In process block 608, notification is received from the Nth client that it intends to leave the multicast distribution network. In process block 610 a database maintained by the supervisory server application is checked to identify the child host from which the Nth child host is receiving the multicast feed, and all the child hosts which receive the multicast data from the Nth client. In process block 612, the child hosts that were receiving the multicast data from the Nth client are directed to connect to the child host from which the Nth client was receiving the multicast data.

Figure 6B:
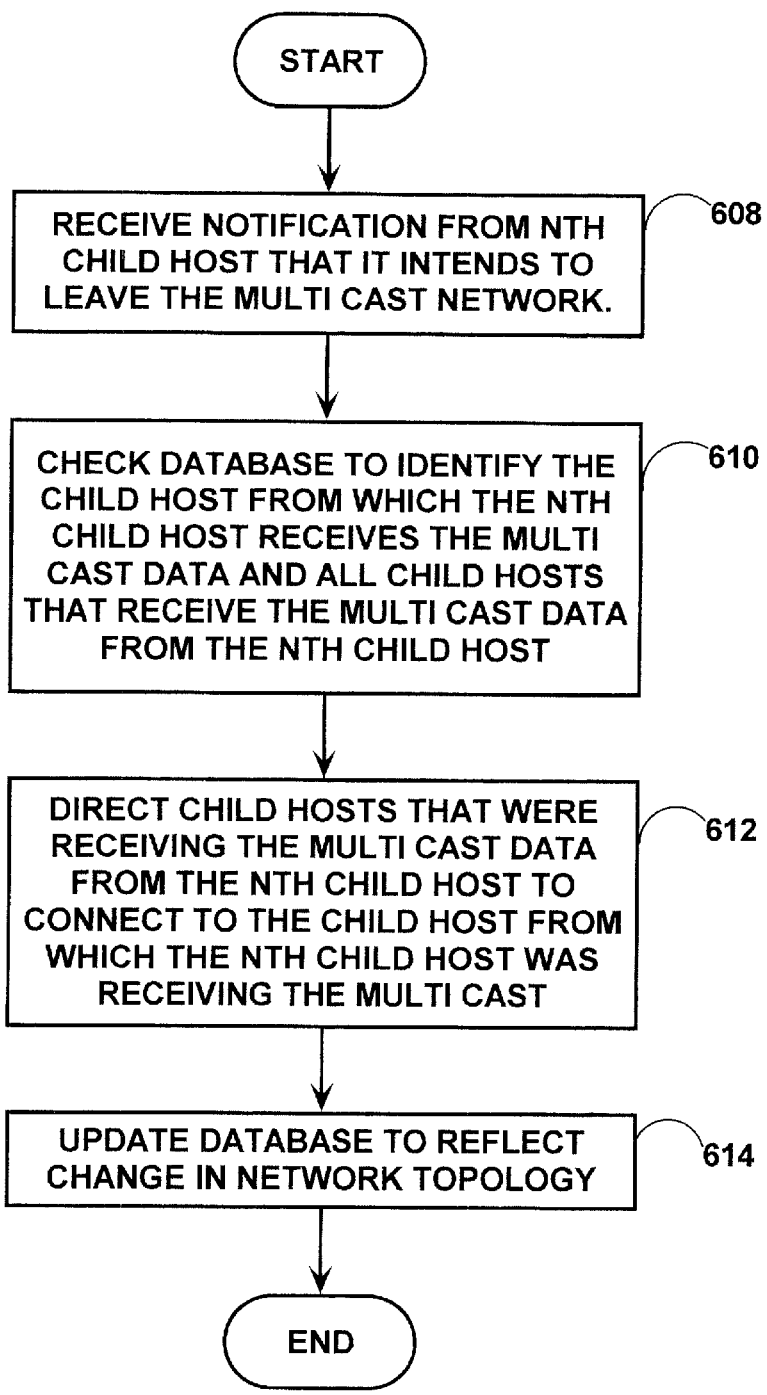

The simplicity of the rearrangement of the topology necessitated when a child host leaves the network according to the process shown in FIG. 6B is simplified by maintaining the multicasting network where child hosts closer to the data source server necessarily have a higher bandwidth capacity, e.g., by following the method of FIGS. 4A, 4C and 4D. If this arrangement were not enforced, there would be no guarantee that the child host from which the Nth child host was receiving the multicast data would have sufficient bandwidth to transmit the multicast data to the child hosts that were receiving the multicast data from the Nth child host.

In process block 614, the database maintained by the supervisory server application is updated to reflect the new topology of the multicast network.

Figure 7A:
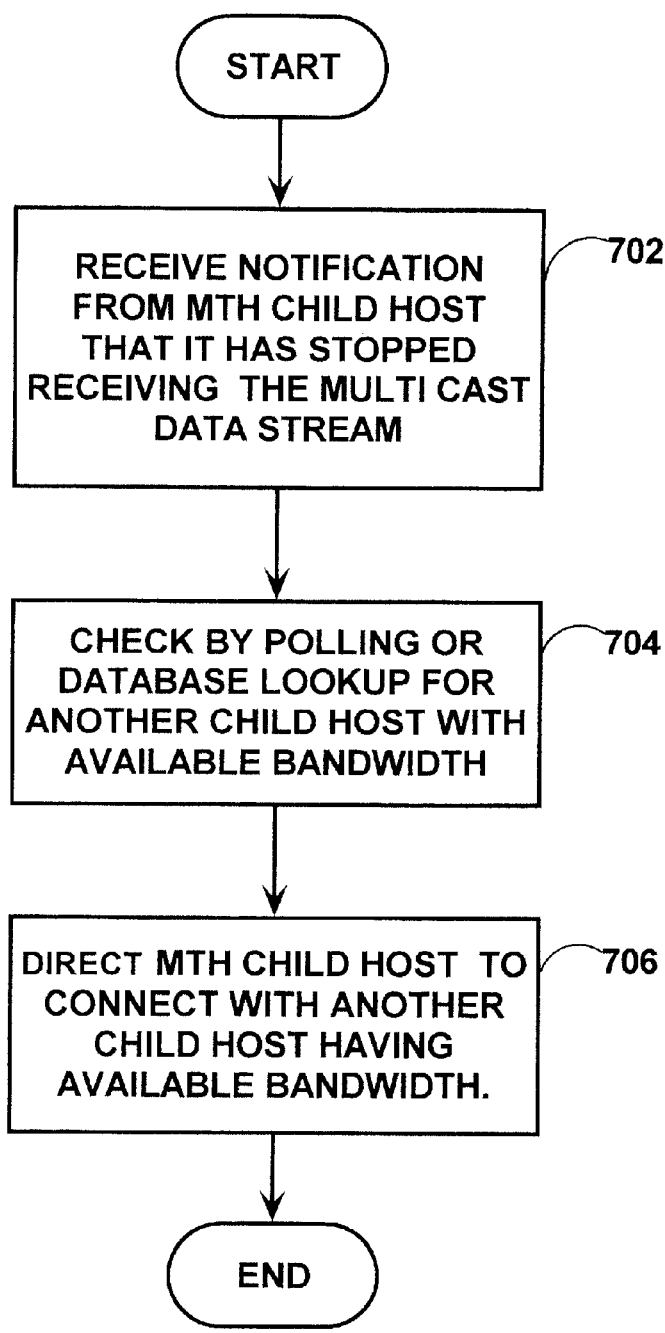
FIGS. 7A–B depict flow diagrams of methods for reconfiguring a distributed multicasting network when a client participant in the network signals it has stopped receiving the multicast a data stream.

Exemplary Method for Handling a Report of Cessation of Receipt of the Multicast by a Child Host Referring to FIG. 7A a method for handling a report by a child host that it has stopped receiving the multicast data stream is shown. In process block 702 notification is received, e.g., by the supervisory server application, from an Mth child host that it has stopped receiving the multicast data stream. In process block 704 a check is made by polling active child hosts or by looking up a database of active child hosts, for a child host that has sufficient availaible bandwidth to transmit the multicast data stream to the Mth child host. In process block 706 the Mth child host is directed to connect to a child host identified in process block 704.

Figure 7B:
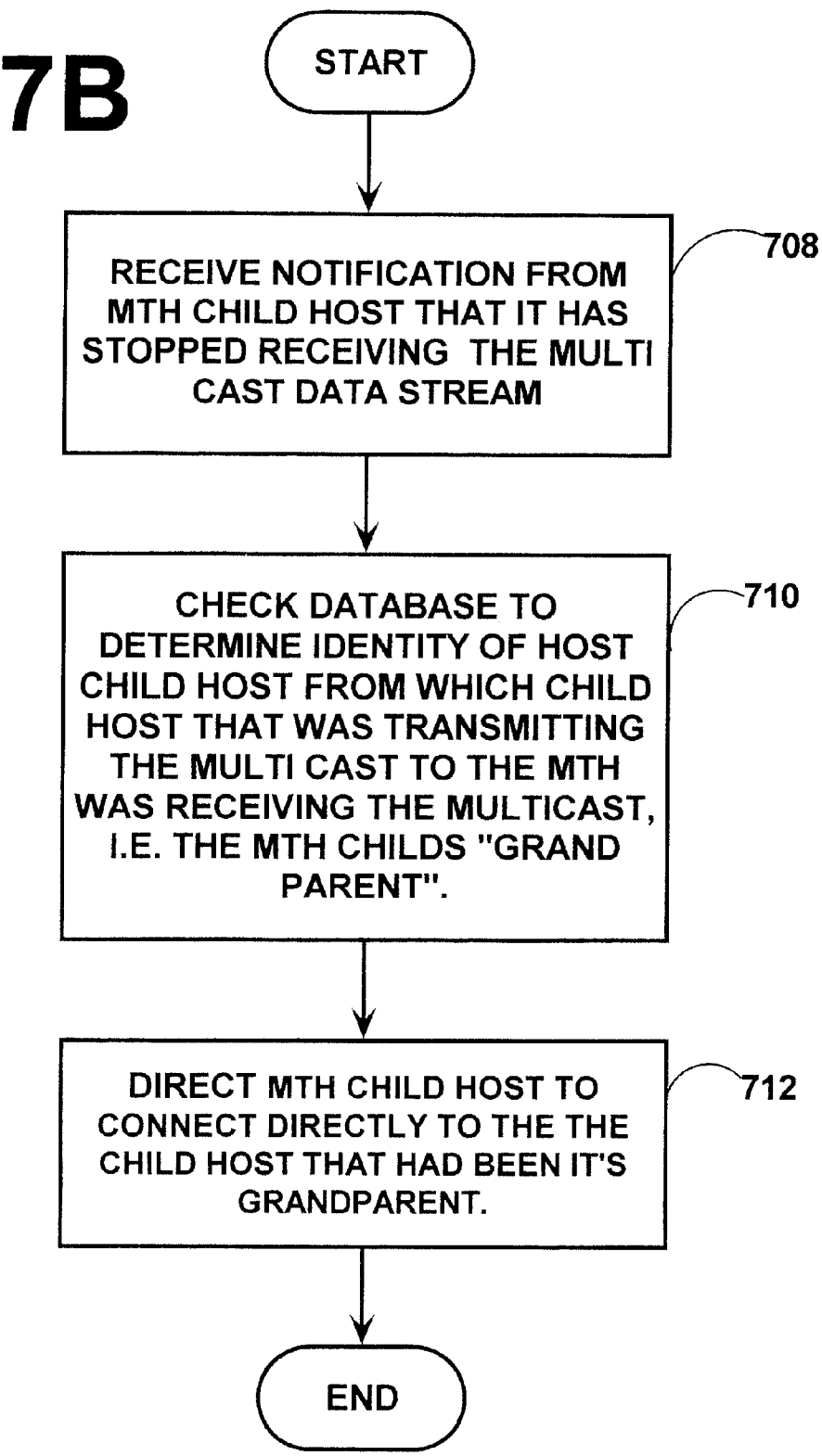

Exemplary Method for Handling a Report of Cessation of Reception of the Multicast Stream which Preserves the Hierarchal Ordering of the Network Referring to FIG. 7B another method for handling a situation in which a child hosts unexpectedly leaves the multicast network, causing dependant child hosts to report cessation of the multicast stream to the supervisory server application. In process block 708 notification is received from an Mth child host that it has stopped receiving the multicast data stream. In process block 710 a database maintained by the supervisory server application is checked to identify to the child host from which the child host that was transmitting the multicast data stream to the Mth child host was receiving the multicast data stream, i.e., the Mth- .child hosts "grandparent". In process block 712 the Mth child host is directed to connect directly to its grandparent child host in order to receive the data stream. The hierarchal arrangement, arrangement of the network will be preserved.

Figure 8A:
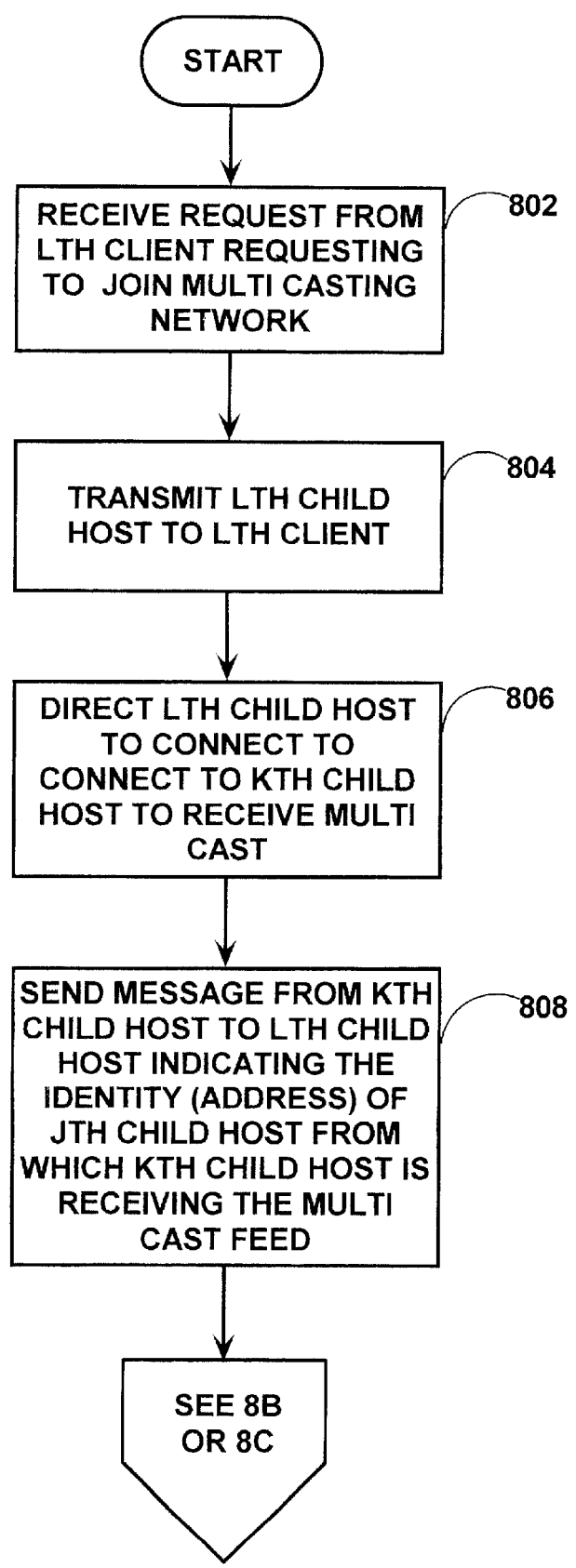
Figure 8C:
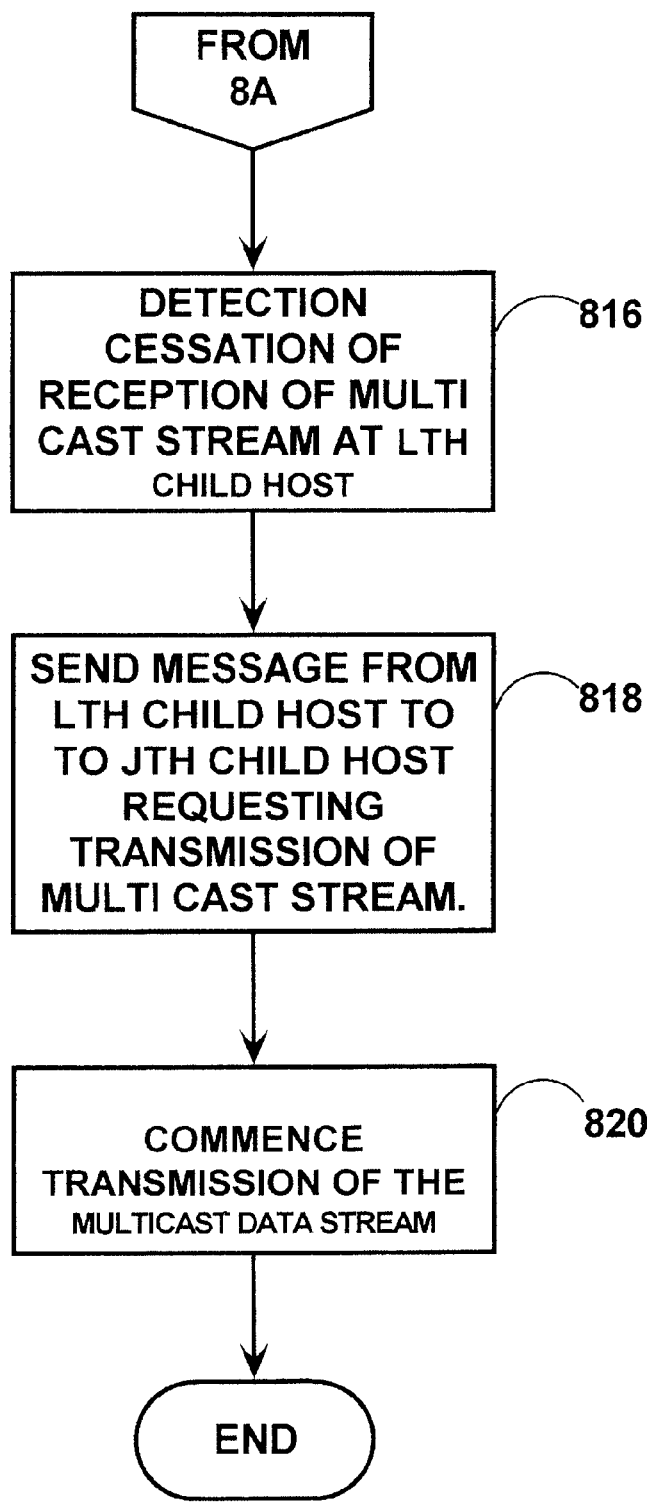

Exemplary Methods for Distributed Control of Network Reconfiguration When a Child Host Leaves the Network FIGS. 8A–C depict flow diagrams of methods for sharing information between child hosts so that each child host can handle reconfiguring the distribution network when the child host from which it was receiving the multicast feed leaves the network. FIGS. 8A, and 8B address the situation in which a child host signals that it will leave the multicast network. FIGS. 8A and 8C address the situation where a child host leaves the network without warning.

Referring to FIG. 8A, in process block 802, a request is received from the Ith client requesting to join the multicasting network. In process block 804 the an Ith child host is transmitted to the Ith client. In process block 806, the Ith child host is directed to connect to the Kth child host to receive the multicast data stream. In process block 808 a message is sent from the Kth child host to the Ith child host identifying the Jth child host from which the Kth child host receives the multicast data stream. The Kth child host will have learned the identity of the Jth child host while initiating the connection for receiving the multicast data stream.

Referring to FIG. 8B a flow diagram of method for handling reconfiguration of the network when a child host signals its intent to leave the network is depicted. In process block 812, a message is sent from the Kth child host to the Ith and or Jth child host indicating its intention to leave the multicasting network. In process block 814, a connection is established between the Jth and Ith child hosts for transmitting the multicast data stream. The connection can be established at the initiation of either the Ith or the Jth child hosts. According to this method the reconfiguration of the multicast network necessitated by a child hosts leaving the network can be accomplished without the intercession of the supervisory control application.

Referring to FIG. 8C a flow diagram for a method of handling a child hosts unexpectedly leaving a multicast network is shown. In process block 816, the Ith child host detects cessation of reception of the multicast data stream. In process block 818, a message is sent from the Ith child host to the Jth child host requesting transmission of the multicast data stream.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although the application of the invention has been discussed with reference to the figures, the invention should not be construed as limited thereto, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for multicasting comprising the steps of:
   receiving a first request to receive a multicast data stream from a first client application running on a first computer by a supervisory server application running on a supervisory server computer;
   transmitting a first instance of a portable deployable child host to the first client computer;
   establishing a connection between a the first portable deployable child host and a data source application;
   transmitting a multicast data stream by the data source application to the child host on the first client computer;
   receiving a second request to receive the multicast data stream from a second client application running on a second computer by the supervisory server application running on the supervisory server computer;
   transmitting a second instance of the portable deployable child host to the second computer;
   establishing a connection between the first instance of the portable deployable child host and the second instance of the portable deployable child host; and
   transmitting the multicast data stream from the first portable deployable child host to the second portable deployable child host.

2. A method according to claim 1 further comprising a step of:
   issuing a directive from the supervisory server application to the second instance of the deployable child host application directing it to contact the first instance of the portable deployable child host.

3. A method for multicasting comprising steps of:
   receiving a Jth request for receiving a multicast stream by supervisory server application running on a supervisory server from a Jth client running on a Jth computer:
   transmitting a Jth instance of a portable deployable child host to the Jth computer;
   establishing a Jth connection between the Jth instance portable deployable child host and an Ith portable deployable host;
   transmitting a multicast data stream though the Jth connection from the Ith instance of the child host to the Jth instance of the child host;
   receiving a Kth request for receiving a multicast stream by the supervisory server application from a Kth client running on a Kth computer;
   transmitting a Kth instance of the portable deployable child host to the Kth computer;
   establishing a Kth connection between the Kth instance of the portable deployable child host and the Jth instance of the portable deployable child host; and
   transmitting the multicast data stream through the Kth connection from the Jth instance of the child host to the Kth instance of the child host.

4. A method according to claim 3 comprising a step of:
   issuing a directive from the supervisory server application to the Jth child host directing it to connect to Kth child host.

5. A method awarding to claim 3 comprising a step of:
   issuing a directive from the supervisory server application to the Jth child host directing it to connect to Ith child host.

6. A method for managing the distribution of a multicast data stream comprising the steps of:
   receiving a Jth request for receiving a multicast stream by supervisory server application running on a supervisory server from a Jth client running on a Jth computer;
   transmitting a Jth instance of a portable deployable child host to the Jth computer;
   performing a test to determine the bandwidth available to the Jth instance of the portable deployable host;
   sending an indication of the bandwidth available to the Jth instance of the portable deployable host to the supervisory server application;
   recording an indication of the bandwidth available to the portable deployable host in a database; and
   determining if the Jth instance of the portable deployable host does not have sufficient bandwidth available to it to send and receive the multicast data stream; and if the Jth instance of the portable deployable host does not have sufficient bandwidth available to it to send and receive the multicast data stream, establishing a connection between the Jth instance of the portable deployable host and a second instance of the portable deployable child host which has a relatively low bandwidth available to it.

7. The method of claim 6 further comprising a step of:
determining if the Jth instance of the portable deployable host does not have sufficient bandwidth available to it to send and receive the multicast data stream; and if the Jth instance of the portable deployable host does have sufficient bandwidth available to it to send and receive the multicast data stream then performing the sub-steps of:
identifying a pair Kth and Ith child hosts in a client server relationship that have available bandwidths comparable to the bandwidth available to the Jth child host;
establishing a connection between the Jth child host and the Ith child host; and
establishing a connection between the Kth child host and the Jth child host.

8. The method according to claim 7 wherein the step of identifying the Kth and Ith child hosts comprises a sub-step of:
identifying a pair of Kth and Ith child hosts in a client server relationship where the bandwidth available to the Kth child host is less than the bandwidth available to the Jth child host, and the bandwidth available to the Ith child host is greater than the bandwidth available to the Jth child host.

9. The method according to claim 8 further comprising a step of:
directing one or more child hosts that were previously connected to the Kth child host to connect to the Jth child host.

10. A method of managing a multicasting network comprising a hierarchy of dependent child hosts comprising the steps of:
receiving notification from a first child host that it intends to leave the multicasting network along with indication of the identity of a second child hosts to which it is connected and sending multicast data stream;
directing the second child host to connect to a third child host to receiving the multicast data stream;
polling a set of child host to find a child host with sufficient available bandwidth to handle transmitting the multicast data stream.

11. A method for distributed control of a multicasting distribution network comprising steps of:
transmitting a Ith child host to a Ith computer from a supervising server;
transmitting a Jth child host to a Jth computer from the supervising server;
transmitting a Kth child host to a Kth computer from the supervising server;
establishing a connection between the Ith and Jth child hosts as directed by the supervising server based upon the bandwidth of the Ith child reported to the supervising server to handle the Jth child host connection with the Ith child host;
transmitting information identifying the Ith child host to the Jth child host;
transmitting a multicast data stream from the Ith child host to the Jth child host;
establishing a connection between the Jth child host and the Kth child host as directed by the supervising server based upon the bandwidth of both the Ith child and the Jth child reported to the supervising server to handle the Jth child host connection with the Kth child host;
transmitting the identity of the Ith child host from the Jth to the Kth child host; and
transmitting a multicast data stream from the supervising server source to the Ith for distribution to the Jth child host and the Kth child host.

12. A method according to claim 11 further comprising a step of:
establishing a connection between the Ith child host and the Kth child host at the initiation of a host selected from a group consisting of the Ith child host and the Kth child host.

13. A method according to claim 11 further comprising a step of:
sending a signal from the Jth child host to a host selected from a group consisting of the Ith child host and the Kth child host that the Jth child host intends to leave the multicasting network.

14. A method according to claim 11 further comprising a step of:
detecting cessation of reception of the multicast data stream at the Kth child host.

15. A computer readable medium containing programming instruction for multicasting comprising programming instructions for:
receiving a first request to receive a multicast data stream from a first client application running on a first computer by a supervisory server application running on a supervisory server computer;
transmitting a first instance of a portable deployable child host to the first client computer;
establishing a connection between a the first portable deployable child host and a data source application;
transmitting a multicast data stream by the data source application to the child host on the first client computer;
receiving a second request to receive the multicast data stream from a second client application running on a second computer by the supervisory server application running on the supervisory server computer;
transmitting a second instance to the portable deployable child host to the second computer;
establishing a connection between the first instance of the portable deployable child host and the second instance of the portable deployable child host; and
transmitting the multicast data stream from the first portable deployable child host to the second portable deployable child host.

16. A computer readable medium according to claim 15 further comprising programming instructions for:
issuing a directive from the supervisory server application to the second instance of the deployable child host application directing it to contact the first instance of the portable deployable child host.

17. A computer readable medium containing programming instructions for multicasting comprising programming instructions for:
receiving a Jth request for receiving a multicast stream by supervisory server application running on a supervisory server from a Jth client running on a Jth computer;
transmitting a Jth instance of a portable deployable child host to the Jth computer;
establishing a Jth connection between the Jth instance portable deployable child host and an Ith portable deployable host;

transmitting a multicast data stream though the Jth connection from the Ith instance of the child host to the Jth instance of the child host;

receiving a Kth request for receiving a multicast stream by the supervisory server application from a Kth client running on a Kth computer;

transmitting a Kth instance of the portable deployable child host to the Kth computer;

establishing a Kth connection between the Kth instance of the portable deployable child host and the Jth instance of the portable deployable child host; and transmitting the multicast data stream through the Kth connection from the Jth instance of the child host to the Kth instance of the child host.

18. A computer readable medium according to claim 17 comprising programming instructions for:

issuing a directive from the supervisory server application to the Jth child host directing it to connect to Kth child host.

19. A computer readable medium according to claim 17 comprising programming instructions for:

issuing a directive from the supervisory server application to the Jth child host directing it to connect to Ith child host.

20. A computer readable medium for managing the distribution of a multicast data stream comprising programming instructions for:

receiving a Jth request for receiving a multicast stream by supervisory server application running on supervisory server from a Jth client running on a Jth computer;

transmitting a Jth instance of a portable deployable child host to the Jth computer;

performing a test to determine the bandwidth available to the Jth instance of the portable deployable host;

sending an indication of the bandwidth available to the Jth instance of the portable deployable host to the supervisory server application;

recording an indication of the bandwidth available to the portable deployable host in a database;

determining if the Jth instance of the portable deployable host does not have sufficient bandwidth available to it to send and receive the multicast data stream; and if the Jth instance of the portable deployable host does not have sufficient bandwidth available to it to send and receive the multicast data stream, establishing a connection between the Jth instance of the portable deployable host and a second instance of the portable deployable child host which has a relatively low bandwidth available to it.

21. The computer readable medium of claim 20 further comprising programming instructions for:

determining if the Jth instance of the portable deployable host does not have sufficient bandwidth available to it to send and receive the multicast data stream; and if the Jth instance of the portable deployable host does have sufficient bandwidth available to it to send and receive the multicast data stream then performing the programming instructions of:

identifying a pair Kth and Ith child hosts in a client server relationship that have available bandwidths comparable to the bandwidth available to the Jth child host;

establishing a connection between the Jth child host and the Ith child host; and establishing a connection between the Kth child host and the Jth child host.

22. The computer readable medium according to claim 21 wherein the programming instructions for:

identifying the Kth and Ith child hosts comprises programming instructions for;

identifying a pair of Kth and Ith child hosts in a client server relationship where the bandwidth available to the Kth child host is less than the bandwidth available to the Jth child host, and the bandwidth available to the Ith child host is greater than the bandwidth available to the Jth child host.

23. The computer readable medium according to claim 22 further comprising programming instructions for:

directing one or more child hosts that were previously connected to the Kth child host to connect to the Jth child host.

24. A computer readable medium for managing a multicasting network comprising a hierarchy of dependent child hosts comprising programming instructions for:

receiving notification from a first child host that it intends to leave the multicasting network along with indication of the identity of a second child hosts to which it is connected and sending a multicast data stream;

directing the second child host to connect to a third child host for receiving the multicast data stream;

polling a set of child host to find a child host with sufficient available bandwidth to handle transmitting the multicast data stream.

25. A computer readable medium containing programming instructions for distributed control of a multicasting distribution network comprising programming instructions for:

transmitting a Ith child host to a Ith computer from a supervising server;

transmitting a Jth child host to a Jth computer from the supervising server;

transmitting a Kth child host to a Kth computer from the supervising server;

establishing a connection between the Ith and Jth child hosts as directed by the supervising server based upon the bandwidth of the Ith child reported to the supervising server to hand o the Jth child host connection with the Ith child host;

transmitting information identifying the Ith child host to the Jth child host;

transmitting a multicast data stream from the Ith child host to the Jth child host;

establishing a connection between the Jth child host and the Kth child host as directed by the supervising server based upon the bandwidth of both the Ith child and the Jth child reported to the supervising server to handle the Jth child host connection with the Kth child host;

transmitting the identity of the Ith child host from the Jth to the Kth child host; and transmitting a multicast data stream from the supervising server source to the Ith for distribution to the Jth child host and the Kth child host.

26. A computer readable medium according to claim 25 further comprising programming instructions for:

establishing a connection between the Ith child host and the Kth child host at the initiation of a host selected from a group consisting of the Ith child host and the Kth child host.

27. A computer readable medium according to claim 25 further comprising a programming instructions for:

sending a signal from the Jth child host to a host selected from a group consisting of the Ith child host and the Kth child host that the Jth child host intends to leave the multicasting network.

28. A computer readable medium according to claim 25 further comprising a programming instructions for:

detecting cessation of reception of the multicast data stream at the Kth child host.

* * * * *